United States Patent [19]

Ballun et al.

[11] Patent Number: 4,702,275
[45] Date of Patent: Oct. 27, 1987

[54] POST ASSEMBLY FOR A BURIED VALVE

[75] Inventors: John V. Ballun, Plainfield; Lorand H. Gain, Jr., Montgomery, both of Ill.

[73] Assignee: AMSTED Industries Incorporated, Chicago, Ill.

[21] Appl. No.: 862,466

[22] Filed: May 12, 1986

[51] Int. Cl.⁴ ............................................. F16K 37/00
[52] U.S. Cl. ..................................... 137/556; 137/369; 137/382.5; 137/797; 251/291; 116/277
[58] Field of Search ...................... 137/553, 556, 382.5, 137/369, 370, 797; 251/291; 116/277

[56] References Cited

U.S. PATENT DOCUMENTS

| | | | |
|---|---|---|---|
| 338,102 | 3/1886 | Payne | 137/369 |
| 659,285 | 10/1900 | Boyle | 137/382.5 |
| 1,120,144 | 12/1914 | Hine | 137/369 |
| 3,554,160 | 1/1971 | Fortune et al. | 116/277 |
| 3,804,056 | 4/1974 | Lee et al. | 116/277 |
| 4,297,966 | 11/1981 | Liberman | 137/553 |
| 4,494,566 | 1/1985 | Sinclair et al. | 116/277 |

FOREIGN PATENT DOCUMENTS 172083 11/1921 United Kingdom ................ 116/277

OTHER PUBLICATIONS

Mueller® UL-FM Fire Protection Products-Catalogue, Mueller Co. Decatur, Ill. 62525, Nov. 1976, pp. C-1-1 thru C-1-4 and C-1-7 through C-1-9.
Clow Pipe Economy 82 (Catalogue) 83, Clow Corporation 1982, p. 146.
Stockham Valves & Fittings Catalogue 83, Stockham Valves & Fittings, Birmingham, Ala., 1983, pp. 118–121, 128 and 129.

Primary Examiner—A. Michael Chambers
Attorney, Agent, or Firm—Charles E. Bouton; Edward J. Brosius

[57] ABSTRACT

A post assembly for a remotely placed valve and valve actuator includes a post with a hinged cover cap and multiple windows evenly spaced below the cap and a target axially movable past said windows on an operating stem fully contained within the post and with the operating nut on said stem below the cover cap and substantially within the target.

19 Claims, 5 Drawing Figures

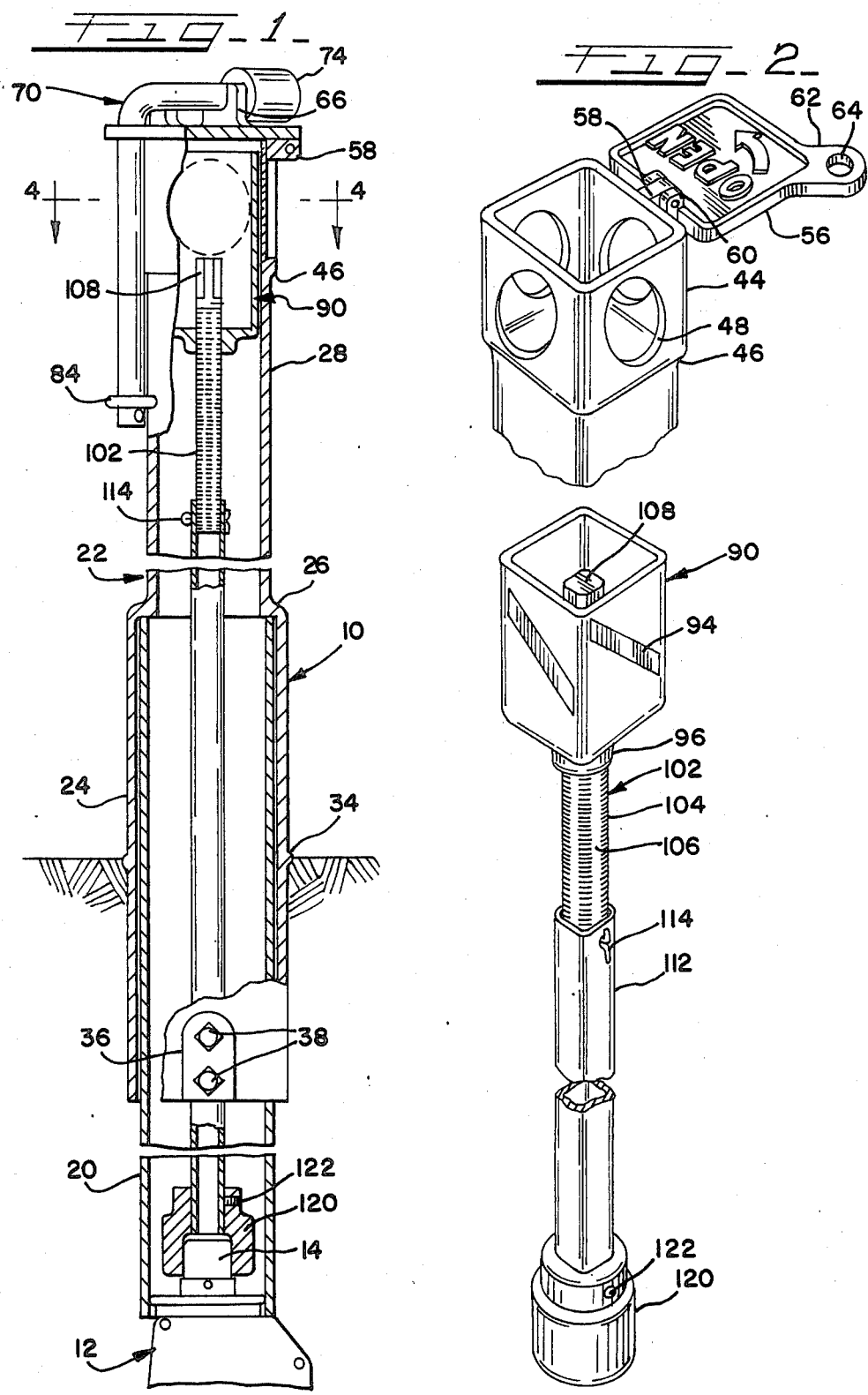

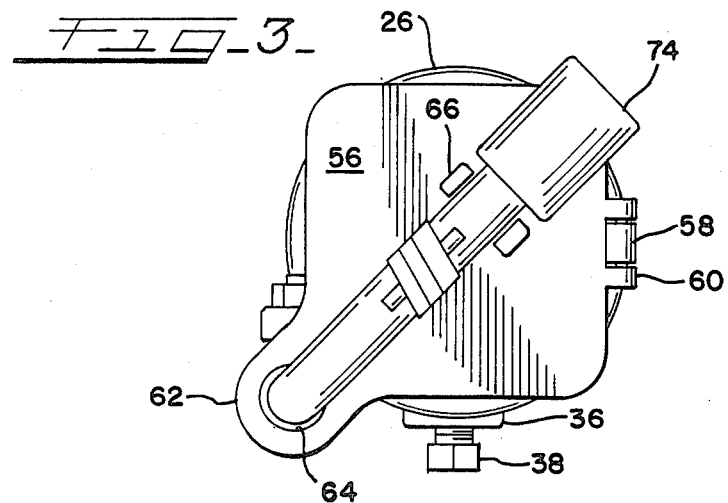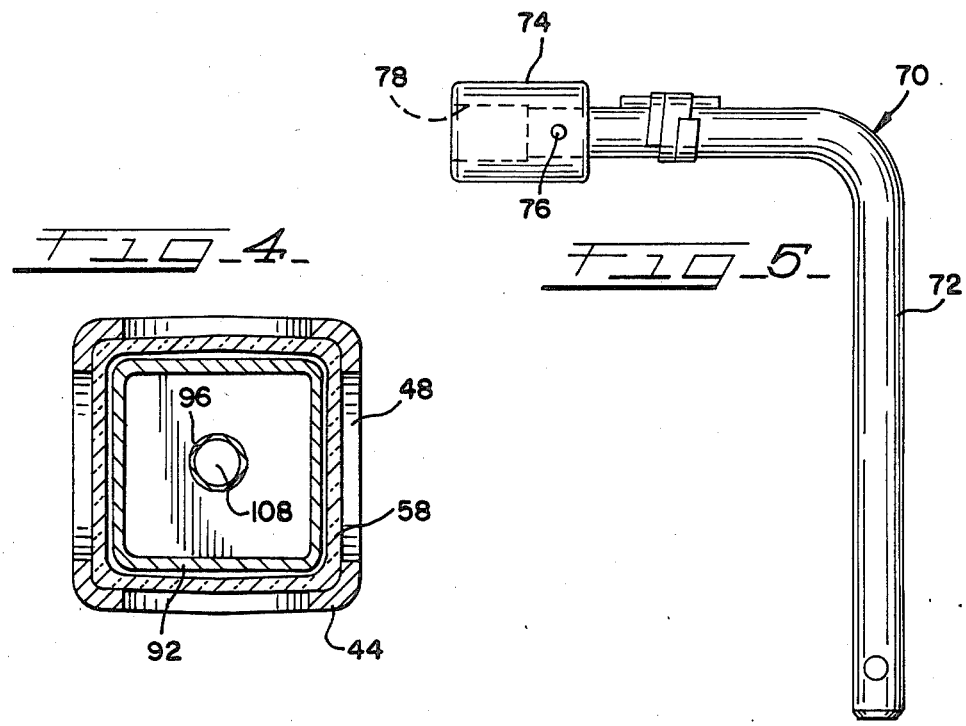

POST ASSEMBLY FOR A BURIED VALVE

BACKGROUND OF THE INVENTION

The present invention pertains to an improved post assembly for a buried valve and more particularly is a valve indicator and operator post assembly with means for displaying valve position that may be operatively connected to a buried or otherwise remotely located fluid control valve with or without a mechanical valve actuator.

In subsurface fluid distribution systems, such as water mains and supply pipes for fire suppression systems, it is often necessary to place manually operable control valves in locations that are remote from a manual access point. For instance many commercial buildings have water supply lines direct from outside water mains which lines are dedicated to automatic sprinkler networks and controlled solely from one or more points outside the buildings. Control is by means of one or more valves such as butterfly valves, buried with the water line below frost level. Normally the valve is positioned in, or biased to, the open position and a mechanical valve actuator is connected to the valve shaft or stem to enable a human attendant to close and reopen the valve as may be needed when inspecting and servicing the system. A mechanical valve actuator is simply a mechanically advantaged machine such as worm levers gears or skotch yoke which enables the attendant to apply sufficient torque to move the valve between open and closed positions.

Often an indicator is provided at the access point to display the position of the valve to facilitate routine inspections. The mechanical actuator may be located at the valve or at the access point with various advantages and disadvantages attendant to each choice. However where the mechanical actuator has been buried with the valve it has often been the practice to separately couple the indicator to the valve apart from the mechanical connection needed to drive the valve actuator. This is due in part to a need to weather proof the indicator mechanism. However in at least one prior device combining an indicator with a drive stem to a buried valve actuator the drive stem terminates as a nut extending through a seal in a permanently fixed cover.

In some instances, such as with a buried gate valve, there is no need for a mechanical actuator and the drive stem may be connected directly with a threaded shaft that raises and lowers the gate. Nevertheless in such instances there is need for an indicator and operator post assembly.

Also in prior devices the indicators have been difficult to read in that they have been viewable from only limited angles and have not been highly visible even in daylight. Prior indicators have been of two general forms, one being a target movable either vertically or rotary within a post to display "open" or "closed" signs within view windows in the post; and the other movable rotary to block sight through two opposite windows, when the valve is closed, and to open sight through opposite windows when the valve is open. The latter is believed to be more visible and readily identified from a distance during daylight as the valve is known to be open when background light is seen through a window. However the view angle is limited and even where two pairs of opposed windows have been utilized they have been located at different post elevations which has resulted in loss of visibility from diagonal locations and under poor light conditions.

In one prior device combining an indicator and drive stem an indicator target has vertically spaced "open" and "closed" signs on two faces which are viewable through two 180° separated windows in a round post. The target slides on two guides within the post and is driven by threads at the upper part of the drive stem which is turned by an operating nut which extends through a seal in a permanently secured cap on the post. A wrench may be locked onto a side of the post between the windows, and the wrench may have a portion that overlies the operating nut to make it unavailable to unauthorized persons.

Prior valve post assemblies have been securely fastened to the buried valve housing and had to be stocked in several lengths to accommodate the wide range of depths at which valves may be buried. This has resulted in added inventory expense; and caused problems of supply and selection in the field where the proper post assembly has to be connected upon placing a valve in a given system. Also prior post assemblies have been susceptible to damage, or damage to the valve and/or valve actuator, resulting from either excessive torque or impact force being transmitted to the valve. When this has occurred it has often required the entire post assembly and valve to be exhumed for servicing.

SUMMARY OF THE INVENTION

Accordingly it is an object of the present invention to provide an improved post assembly for a buried valve which contains both valve position indicator and valve drive connection.

Another object of the present invention is to provide an improved post assembly for a buried valve which has a highly visible valve position indicator which is viewable from nearly all angles.

Still another object of the present invention is to provide an improved post assembly for a buried valve in which a common shaft is utilized to drive both valve and valve indicator but which has a minimum of bearing points.

Yet another object of the present invention is to provide an improved post assembly for a buried valve having readily adjustable parts to accommodate for the depth at which the valve is buried.

A further object of the present invention is to provide an improved post assembly for a buried valve having a valve indicator that moves vertically within the post.

A still further object of the present invention is to provide an improved post assembly for a buried valve having means to guard against exerting excessive force to the valve.

An even further object of the present invention is to provide an improved post assembly for a buried valve which is not securely fastened to the valve and thereby may become disengaged from the valve if it receives a damaging impact.

The present invention comprises a post having a lower barrel portion of preferably circular cross section that extends past a narrowing shoulder to an upper mast portion of square cross section relatively smaller than the barrel portion. When field assembled the post is placed over a standard soil pipe that is cut to an appropriate length to loosely extend from the buried valve to slightly above grade level with the post shoulder seated upon the upper end of the pipe. The mast portion extends upwardly a standard distance and terminates in a slightly enlarged enclosure having an open top with hinged cover cap and large windows at each side. A square target (indicator) cup is movable within the mast past the windows and is threadly engaged to a partially threaded operating stem which extends downwardly from the target cup into the mast. A hollow tube telescopingly fitted to the stem is extended through the barrel and access pipe to a valve or valve actuator. A wrench is detachably mounted on the post cover cap for use by an attendant to manually turn the stem; and the wrench preferably includes a torque limiting connection to prevent excessive force being applied to the valve actuator.

DESCRIPTION OF THE DRAWINGS

Further objects and advantages will become apparent from the following detailed description of the invention when read in conjunction with the drawings wherein:

FIG. 1 is a vertical side view in section of an embodiment of the present invention;

FIG. 2 is an exploded view of certain portions of the apparatus shown in FIG. 1;

FIG. 3 is a plan view of the apparatus of FIG. 1;

FIG. 4 is a section view of the apparatus taken at line 4—4 in FIG. 1; and

FIG. 5 is a side view of the wrench part shown in FIGS. 1 and 3.

DETAILED DESCRIPTION OF THE INVENTION

As may be seen best in FIG. 1 a preferred embodiment of the present invention comprises a post assembly, generally 10, which provides an operative connection to a drive nut 14 of valve actuator, generally 12, of a buried, or otherwise relatively inaccessible, valve (not shown). The post assembly, generally 10, is seated on and supported by an access pipe 20 that is cut to size in the field and loosely placed upon the valve or valve actuator housing to extend upwardly about ten (10) inches above the projected grade level before the valve and pipe trench is back filled with earth. Usually the access pipe 20 is cut from a length of standard five inch diameter iron soil pipe and is not securely fastened to the housing. In this way should the post assembly be later impacted and displaced, such as by being struck by a vehicle, the access pipe will not transmit the full impact force to the valve or actuator.

The outer part of the post assembly, generally 10, is a shell or post, generally 22, usually cast of metal such as iron, having a lower barrel 24 of preferably circular cross section sized to closely telescope over the access pipe 20, and which changes at a first shoulder 26 to a slightly smaller upper mast portion 28 having an angular, preferably square, cross section. The shoulder 26 will seat against the upper end of the access pipe 20 when the parts are assembled in the field. Conveniently there is an annular embossment or ridge 34 about the barrel at about grade level and the lower edge of the barrel, which will become buried, has a reinforced boss 36 and set screws 38 therein by which the post generally 22 may be secured to the access pipe.

At the upper end of the mast 28 usually about thirty inches above grade level there is a slightly enlarged enclosure 44 with a second shoulder 46 and an open top. The enclosure 44 is also of angular cross sectional shape which corresponds to the mast 28, preferably square but may have three or more sides, and a plurality of open windows or ports 48 are spaced equally about the enclosure 44 (one in each side wall of the square enclosure illustrated) and at a uniform short distance from the top of the enclosure. Preferably the windows are slightly oval with the major dimension parallel with the axis of the post generally 22.

A transparent sleeve 50 of a shape congruent with the enclosure is inserted within the enclosure 44 and seated on the second shoulder 46. Sleeve 50 is preferably comprised of clear plastic, but could be made of tempered glass, and forms a closure for the windows 48. Also the sleeve 50 has an internal dimension substantially the same as mast 28 and is therefore essentially coextensive therewith.

The enclosure is covered by a cap 56 which is pivotally connected or hinged to a hinge piece 58 formed at one side of the enclosure 44 by means of a hinge bracket 60 on a corresponding side of the cap. At a corner of the cap 56 generally opposite the hinge bracket 60 but located to extend outwardly between two adjacent enclosure sides is an ear or tab 62 which functions as both a handle for the hinged cap and also a retainer for a wrench, generally 70, which passes through a hole 64 in the tab 62 so as to not obstruct any window 48 and is held in a bifurcated bracket 66 on the cap 56.

As may be seen in FIGS. 2, 3 and 5 the wrench, generally 70, is preferably in two parts comprised of a bent handle 72 which is fitted into a round opening at one end of a separate socket head 74. The socket head 74 is secured to the handle 72 solely be means of a frangible torque pin 76 which is of suitable dimension and material to break upon application of a force that would be excessive for a given valve actuator. A particular post assembly can be engineered in part to accommodate a given valve system by appropriate selection of the torque pin. An extra replacement pin is advantageously taped to the wrench handle 72 for future use. The socket head 74 also includes an operative drive socket 78 opposite the handle 72; and the wrench generally, 70 is utilized in a manner hereafter explained. A further securement for the wrench 70 may be provided in the form of a bail 84, fastened to the exterior of the mast 28 below the cap tab 62, to receive an end of handle 72; and the handle end may contain a diametrical hole to receive a lock, not shown.

A target, generally 90, is located within the upper portion of the mast 28 so as to be movable within the enclosure 44 across the windows 48. According to the present invention it is necessary for the target to move axially within the mast 28 portion of post 22 and to be constrained against rotary movement therein. In the preferred structure heretofore described where the mast 28 and enclosure 44 have a square cross section the target is a four sided cup 92 of a cross section to fit closely within the mast 28 and transparent sleeve 50. It is within the purview of the invention to utilize masts and targets of cross sectional shape other than square so long as the parts are congruent or means are provided between the mast and target, such as axially aligned ribs, to prevent relative rotary movement.

It is also preferred to make the target cup 92 highly visible through the windows 48 as by covering the cup with a reflective tape or coating and/or placing reflective stripes 94 on each respective side of the cup 92. The bottom of the cup 92 is closed by a web or the like and contains a central port 96 which is threaded to receive an upper end of an operating stem 102.

The operating stem 102 is preferably a relatively short length (about twelve inches long) of solid square section preferably brass rod which has threads 104 cut only at the corners of the rod so as to leave flat lands 106 at four sides between threaded portions. The upper end of the stem is formed into a nut 108 which corresponds to the socket 78 in wrench generally 70 so that the stem may be turned thereby. The threads 104 correspond to the threaded port 96 in target cup 92 so that the latter will move along the operating stem 102 when it is manually turned by the wrench 70. The opposite lower end of stem 102 is drilled diametrically to receive a cotter pin or the like. The operating stem 102 length may be substantially a constant for all post assemblies conforming to the present invention. Also it is possible by choosing appropriate thread pitch for the stem 102 and threaded port 96 to accommodate the particular characteristics of any valve and valve actuator.

An extension tube 112 of hollow square section dimensioned to telescope closely on operating stem 102 is secured to the latter by a cotter pin 114 and extends through the barrel 24 and access pipe 20 to the actuator nut 14 of the valve actuator. The extension tube 112 is cut to length in the field in accordance with the needs of a specific valve installation and will normally be about eight (8) inches greater than the length of the access pipe 20. The end of extension tube 112 remote from the operating stem 102 is fitted within a square socket at one end of a drive collar 120 and secured by a set screw 122. An opposite end of the drive collar 120 in turn contains a socket which conforms to and fits on the actuator nut 14. However the drive collar 120 is not securely fastened to the actuator nut 14 and thus the socket may readily disengage therefrom, should the post assembly, generally 10 be impacted and displaced, thereby protecting the valve or actuator against damage.

It will be understood from the foregoing that the post assembly is erected in the field by first placing the access pipe 20 on the valve actuator 12 and cutting same to appropriate length. The extension tube 112 with drive collar 120 are then temporarily placed on the actuator nut 14 and a measurement taken for cutting the extension tube to proper length (preferably one end of the extension tube 112 is predrilled for the cotter pin 114 and the cut is made from the opposite end of the stock). The target cup 92 is threaded onto the operating stem 102 close to the operator nut 108; and when the extension tube 112 is cut to size and reassembled in the drive collar 120 it is telescoped onto the standard predrilled end of the operating stem and secured by the cotter pin 114. These parts are laid aside while the post generally 22 is telescoped onto the access pipe 20 and oriented to direct the windows 48 for best possible see through viewing from expected vantage or observation points. It will be apparent from the drawings that by locating large windows 48 at a common level in all sides of the mast 28 it is possible to see through two such windows from nearly any angle away from the post generally 22. The set screws 38 are then fastened onto the pipe 20.

Thereafter the field assembled drive collar 120, extension tube 112, operating stem 102 and target cup 92 are lowered through the enclosure 44 until the actuator nut 14 is engaged. The operator nut 108 at the top of stem 102 should be within the enclosure 44. When the valve is closed the top of the target cup 92 should be approximately one-half inch below the top of the enclosure 44. The latter may be adjusted by lifting the stem-collar assembly from the actuator nut 14 and turning the stem in the threaded port 96 until the target cup 92 is moved to an appropriate position, and the assembly is then reinserted on the actuator nut. The cover cap 56 is closed over the enclosure 44 so as to completely encase and hide the operator nut 108.

Thereafter the valve may be operated by opening the cap 56, placing the wrench generally 70 on the operating nut 108 and rotating the latter in the appropriate direction. Preferably the inside surface of the cover cap 56 is embossed or otherwise marked with a directional arrow to show the direction of rotation to open the valve. As the operating nut 108 is turned the target cup 92 will descend in the enclosure 44 as the valve is opened and the target will fully clear the windows 48 when the valve is moved to a full open position.

When the valve has been moved to the proper position the wrench 70 is removed from nut 108, the cap 56 closed and the wrench handle 72 inserted through hole 64 and bail 84. A lock may be secured to the wrench handle 72 below the bail 84.

A further advantage of the present design is that the multiple windows 48 all become exposed simultaneously thereby permitting daylight to enter the entire enclosure and enabling sight through the post from nearly any angle rather than only from a straight on view of a window. Similarly a highly reflective target surface becomes visible at every window simultaneously as the valve is partially or fully closed. Night time detection is facilitated by directing a light beam at the enclosure 44 on top of the post 22 and looking for the presence or absence of the reflective stripe in each or any window which signifies a closed valve condition.

The foregoing detailed description has been given for clearness of understanding and to provide a complete description of a preferred embodiment of the invention. Various modifications maybe made without departing from the spirit and scope of the invention which is defined in the claims.

What is claimed is:

1. An improved post assembly for a buried valve wherein the valve is located at one end of an access pipe, said post assembly comprising:

a post having a barrel portion to concentrically fit upon an opposite end of said pipe and a mast portion extending axially beyond said barrel portion, said mast portion having an angled cross section with multiple sides;

a cover cap hinged to an end of said mast portion beyond said barrel portion;

a plurality of windows in said mast portion near said cover cap and substantially equally distant therefrom, at least one window being in each of said multiple sides whereby a line of sight may extend through two windows from nearly any angle away from said post;

a target cup axially movable within said mast portion, said target cup having a cross section conforming substantially and being congruent to the interior cross section of said mast to thereby prevent relative rotational movement between said mast and said target;

an operating stem extending axially within said mast and into said target cup, said operating stem having an operator nut at one end located within said target cup below said cover cap and having threads along its surface, and means on said target cup to engage said threads whereby said target cup will move axially past said windows as said operating stem is turned;

an extension tube axially connectable to said operating stem, said extension tube being of a length to extend from said stem through said access pipe to an actuator nut on said valve;

and means for detachably connecting said extension tube to said actuator nut.

2. The post assembly of claim 1 wherein said windows are located in an expanded enclosure portion of said mast and a transparent window member is located within said enclosure.

3. The post assembly of claim 2 wherein said transparent window member is a multi-sided sleeve having an interior cross section corresponding to said mast.

4. The post assembly of claim 1 wherein said target cup is coated with a highly visible material.

5. The post assembly of claim 1 wherein said target cup bears reflective stripes in the areas movable past said windows.

6. The post assembly of claim 1 wherein said cover cap includes means for holding a wrench thereon.

7. The post assembly of claim 6 including a wrench held on said cover cap and extending downwardly therefrom along said mast between two adjacent windows.

8. The post assembly of claim 1 wherein said cover cap is hinged to one side of said mast and includes a tab extending outwardly from above a corner of said mast substantially opposite said one side, a bracket on said cover cap to hold the socket end of a wrench and a hole in said tab to receive a handle of such wrench extended downwardly by said mast.

9. The post assembly of claim 8 including a wrench having a bent handle and a socket head connected to said handle with a frangible torque pin.

10. The post assembly of claim 1 wherein the cross section of said mast is of rectangular form.

11. The post assembly of claim 1 wherein the cross section of said mast is square.

12. The post assembly of claim 1 wherein said operating stem is a rod of angular cross section having threads only at the corners thereof whereby to leave multiple flat lands along the length of said stem between the threaded corners, and said extension tube is hollow and of angular cross section corresponding to said stem so as to telescope thereon.

13. An improved post assembly for buried valve and valve operators wherein the valve and valve actuator are located at one end of an access pipe, said post assembly comprising:

a post having a cylindrical barrel portion to concentrically fit upon an open end of said access pipe opposite said valve and having an angled cross section mast portion having a plurality of sides extending axially beyond said barrel portion, said barrel and mast portions being joined by a first shoulder which seats against said open end of said access pipe;

a multi-sided enclosure at an end of said mast portion beyond said barrel portion said enclosure having a cross section corresponding to the shape of said mast and being joined to said mast portion by a second shoulder, said enclosure being open at an end spaced from said second shoulder;

windows in each side of said enclosure, said windows being of oval shape and equally spaced from the open end of said enclosure;

a cover cap hinged to said enclosure so as to be movable onto and from said open end, said cover cap having a wrench mounting bracket on the outer surface thereof;

a transparent window sleeve fitted closely within said enclosure and congruent thereto, said window sleeve being seated on said second shoulder and the inner surfaces of said sleeve being slightly outside of the planes of the inner surfaces of said mast portion;

a target cup axially movable within said mast portion and said transparent window sleeve and being substantially congruent thereto whereby said target cup will not rotate relative to said mast portion;

an operating stem extending axially within said mast and into said target cup, said operating stem being a shaft of angled multi-sided cross section having an operator nut formed on an end within said target cup to be detachably engagable by a wrench and said operating stem having discontinuous threads cut into the corners thereof with flat lands on the surfaces between said threads, and a threaded port in said target cup to engage said threads whereby said target cup will move axially as said operating stem is turned;

an extension tube of hollow multi-sided cross section to receive said operating stem and engage the flat lands thereon at one end of said tube and extending axially from said operating stem through said access pipe to an actuator nut on said valve actuator;

and a collar fastened to an end of said extension tube opposite said operating stem, said collar having a cavity adapted to engage all sides of said actuator nut.

14. The post assembly of claim 13 wherein said mast has a square cross section.

15. The post assembly of claim 13 wherein said cover cap is hinged to one side of said enclosure and corresponds to the shape of said enclosure, a tab on said cover cap at a location spaced from said one side, said tab extending outwardly of said enclosure, when said cover cap is closed, at a location between two adjacent sides of said enclosure, and a hole in said tab whereby the handle of a wrench held in said mounting bracket may be extended downwardly past said enclosure and between two adjacent windows therein.

16. The post assembly of claim 13 including a bail secured to said mast below said enclosure and aligned with said tab whereby to receive an end of a wrench handle extended through the hole in said tab and a hole in said handle located below said bail to receive a lock for preventing unauthorized removal of the wrench.

17. The post assembly of claim 15 including a wrench having a bent handle and a socket head connected to said handle wherein the socket head is held at said bracket on said cover cap and the wrench handle extends through said tab hole and said bail with a hole in said wrench handle located below said bail to receive a lock for preventing unauthorized removal of the wrench.

18. The post assembly of claim 13 wherein said access pipe is seated loosely upon said valve actuator and said collar is not securely fastened to said actuator nut, whereby said post assembly may be displaced and released from said valve actuator without transmitting damaging forces thereto.

19. The post assembly of claim 13 wherein said target cup bears reflective stripes in the areas movable past said windows.

* * * * *